May 26, 1931. C. C. DODGE 1,807,472
REFLECTING LENS UNIT
Filed Oct. 21, 1929

INVENTOR.
Clinton C. Dodge,

Geo. P. Kimmel
ATTORNEY.

Patented May 26, 1931

1,807,472

UNITED STATES PATENT OFFICE

CLINTON C. DODGE, OF LOUISVILLE, KENTUCKY, ASSIGNOR OF ONE-HALF TO HERMAN FREDERICK DELMANHORST, OF LOUISVILLE, KENTUCKY

REFLECTING LENS UNIT

Application filed October 21, 1929. Serial No. 401,333.

This invention relates to reflecting lenses of that type whereby light rays emanating from a light source pass through the lens to a reflector and are reflected back through the lens, and the invention has for its object to provide, in a manner as hereinafter set forth, a reflecting lens unit constructed and arranged whereby the outer shell so employed in devices of this character is dispensed with.

A further object of the invention is to provide, in a manner as hereinafter set forth, a reflecting lens unit whereby the cost connected with the assemblage thereof is materially reduced with respect to the expense for the assemblage of devices of such type now in general use.

A further object of the invention is to provide, in a manner as hereinafter set forth, a reflecting lens unit constructed and arranged to overcome the necessity of cleaning and polishing the lens part after the latter has been sealed or connected in position.

A further object of the invention is to provide, in a manner as hereinafter set forth, a reflecting unit including a lens provided at its inner end with a cavity or recess, a reflecting medium at the base of the cavity or recess and means to protect such medium in a manner to materially enhance the life thereof, under such conditions providing for a reflecting unit of unusual durability.

A further object of the invention is to provide, in a manner as hereinafter set forth, a reflecting lens unit whereby uniformity of any desired dimensions can be rigidly maintained and much closer reflecting limits reached.

A further object of the invention is to provide, in a manner as hereinafter set forth, a reflecting lens unit to overcome the possibility of rust, corrosion, tarnish, etc., for an indefinite period.

A further object of the invention is to provide, in a manner as hereinafter set forth, a reflecting lens unit constructed in a manner as to be free of conflicting or opposing metals.

A further object of the invention is to provide, in a manner as hereinafter set forth, a reflecting lens unit set up or formed to greatly facilitate the installation of the unit in both new and old work.

A further object of the invention is to provide, in a manner as hereinafter set forth, a reflecting lens unit having the rear of the lens body recessed for the positioning at the base of the recess a reflecting medium, further with the reflecting medium secured in position by a body of cementitious material completely enclosing the concavity or recess, and further with the unit including means to prevent the cementitious body from being impaired by atmospheric conditions, under such circumstances preventing any impairment or injury to the reflecting medium resulting in a lens unit of unusual durability.

A further object of the invention is to provide, in a manner as hereinafter set forth, a reflecting lens unit which is simple in its construction and arrangement, strong, durable, compact, readily installed in position for reflecting, thoroughly efficient in its use, conveniently assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
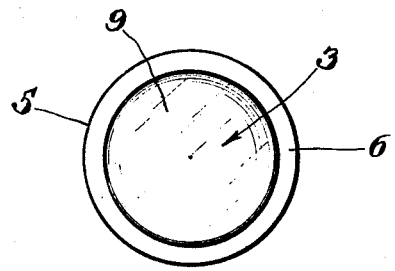
Figure 1 is an end elevation of a reflecting lens unit in accordance with this invention looking towards the front end of the lens unit.
Figure 2:
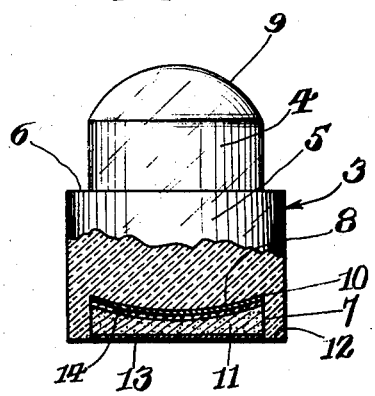
Figure 2 is an elevation partly in section of a reflecting lens unit in accordance with this invention.

Referring to the drawings, a reflecting lens unit in accordance with this invention includes a lens part or body referred to generally at 3, of circular cross section and formed of an outer and an inner portion 4, 5 respectively. The portions 4, 5 can be of any desired length, but the diameter of the portion 4 is materially less than the diameter of the portion 5 whereby at the point of joinder of the portion 4 with the portion 5, a flat, peripheral annular shoulder 6 will be formed on the lens part or body 3.

The portion 5 of the lens part 3 at the rear thereof is formed with a recess or pocket 7 having the wall thereof in alignment with the periphery of the portion 4 of the lens part 3. The base or inner wall 8 of the recess or pocket 7 is of convex contour. The outer end portion 4 of lens part 3 is of convex contour, as indicated at 9, but the arc upon which the outer end of portion 4 is taken is materially less than the arc upon which the inner wall or base 8 of the recess or pocket 7 extends.

Within the pocket 7 is arranged a reflecting medium and which can be provided by silvering the inner wall or base 8 or by an independent reflector which is positioned against the inner wall or base 8 and of a curvature corresponding to the curvature of the latter. Preferably the inner wall or base 8 of recess or pocket 7 will be silvered to provide a reflecting medium as indicated at 10. Positioned against the rear of the reflecting medium 10 is a protecting member 14 therefor, formed of cushioning material, such as felt. The member 14 is coextensive with the reflecting medium 10. The recess or pocket 7 is filled with a backing for the reflecting medium and protecting member. The backing is indicated at 11 and formed of cementitious material and snugly engages the wall of the recess or pocket 7 and also snugly engages throughout the rear of the protecting member 14. It has been found that unless the reflecting medium was protected, the action of the cementitious material 11 on such medium would contract, shrivel or crack the latter, thereby impairing its function. To prevent such action the protecting member 14 is interposed between the backing and the reflecting medium.

To prevent the cementitious body from being impaired by atmospheric conditions or being attacked by moisture or rain, the rear end of lens part 3 as well as that face of the body 11 which is flush with the rear end 12 of lens part 3 is provided with a coating 13 formed of litharge or a material which is impervious to rain, heat and moisture, and said coating 13 prevents any possibility of the cementitious body being impaired, and as the reflecting medium 10 is protected by member 14 the arrangement culminates in the setting up of a reflecting unit of unusual durability.

The peripheral shoulder or flange 6 is not beveled but is disposed at right angles with respect to portion 4 of the lens 3 and is adapted to abut against the structure to which the lens body is attached and from which projects the portion 4 of the lens part or body 3. After the lens unit is positioned with respect to a support, (not shown) so that the portion 4 of lens body or part 3 will project from such support, the unit is secured in any suitable manner to the supporting structure therefor.

A reflecting unit in accordance with this invention is so constructed and arranged that it enables the elimination of the outer shell usually employed in devices of this character, and under such conditions materially reducing the cost of assemblage, as well as the total omission of cleaning and polishing the lens after sealing. Owing to the wide edge surrounding the cavity it obviates the necessity or reduces to a minimum cleaning and polishing of the bottom of the lens body. The construction of the reflecting unit further prevents the possibility of rust, corrosion, tarnish, etc., and can be employed for indefinite periods, due to the fact that the possibility of injuring the reflecting medium is reduced to a positive minimum.

The reflecting unit functions in a manner whereby light rays emanating from a light source pass through the lens to the reflecting medium and are reflected back through the lens and that further it functions with substantially equal efficiency through a comparatively wide range of angles of incidence of the light sufficiently diverging to strike the eyes of the occupants of the car due to the setting up of the reflecting medium upon a greater arc than the arc of the outer end of the lens body.

It is thought that the many advantages of a reflecting lens unit in accordance with this invention can be readily understood, and although the preferred embodiment of the invention is as illustrated and described, yet it is to be understood that changes in the details of construction can be had which will fall within the scope of the invention as claimed.

What I claim is:

1. A reflecting lens unit comprising a lens body having a recess in its inner end, a reflector positioned within said recess at the base of the latter, a protecting member possessing a cushioning characteristic positioned completely within said recess against the rear face of the reflector, and a backing of cementitious material within said recess, snugly engaging the wall of the latter and snugly engaging throughout the rear of said member.

2. A reflecting lens unit comprising a lens body having a recess in its inner end, a reflector positioned within said recess at the base of the latter, a protecting member possessing a cushioning characteristic positioned completely within said recess against the rear face of the reflector, a backing of cementitious material within said recess, snugly engaging the wall of the latter and snugly engaging throughout the rear of said member, and an impervious coating for the rear of said backing and the rear end of said body.

3. A reflecting lens unit comprising a lens body, a reflecting medium positioned completely within said body in proximity to the rear end thereof, a protecting member possessing a cushioning characteristic positioned completely within said body in proximity to the rear end thereof and seated against the rear of said medium, and a cementitious body positioned completely within the rear of said lens body and bearing throughout against the rear of said member.

4. A reflecting lens unit comprising a lens body, a reflecting medium positioned completely within said body in proximity to the rear end thereof, a protecting member possessing a cushioning characteristic positioned completely within said body in proximity to the rear end thereof and seated against the rear of said medium, a cementitious body positioned completely within the rear of said lens body and bearing throughout against the rear of said member, and an impervious coating for the rear of said cementitious body and rear end of the lens body.

5. A reflecting lens unit comprising a lens body, a reflecting medium positioned completely within said body in proximity to the rear end thereof, a protecting member possessing a cushioning characteristic positioned completely within said body in proximity to the rear end thereof and seated against the rear of said medium, and a cementitious body positioned completely within the rear of said lens body and bearing throughout against the rear of said member, the edges of said medium, member and cementitious body being flush with each other.

In testimony whereof, I affix my signature hereto.

CLINTON C. DODGE.